(No Model.)  J. C. GARVEY.  4 Sheets—Sheet 1.
BICYCLE ATTACHMENT.
No. 558,681.  Patented Apr. 21, 1896.
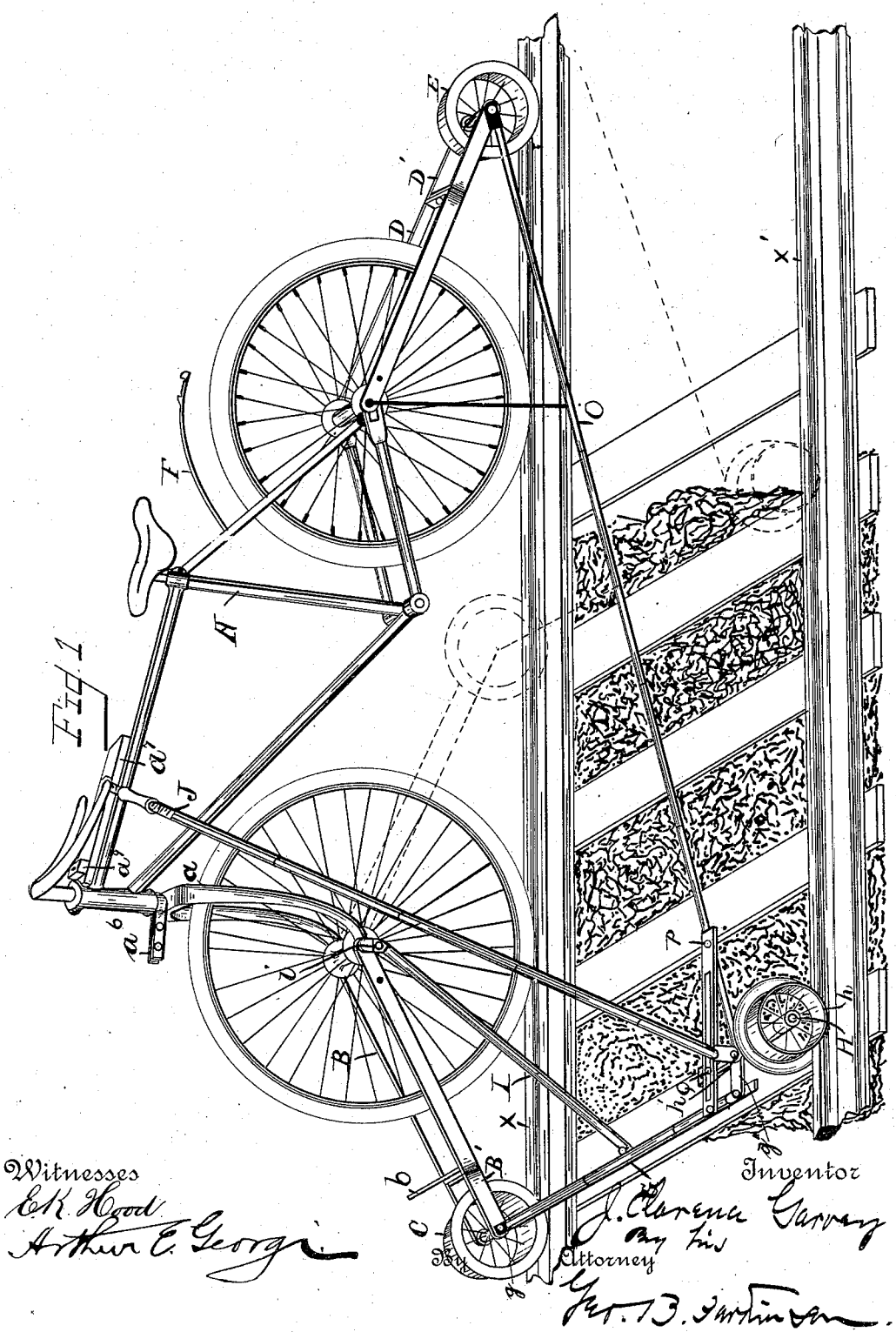

(No Model.) 4 Sheets—Sheet 2.
J. C. GARVEY.
BICYCLE ATTACHMENT.
No. 558,681. Patented Apr. 21, 1896.
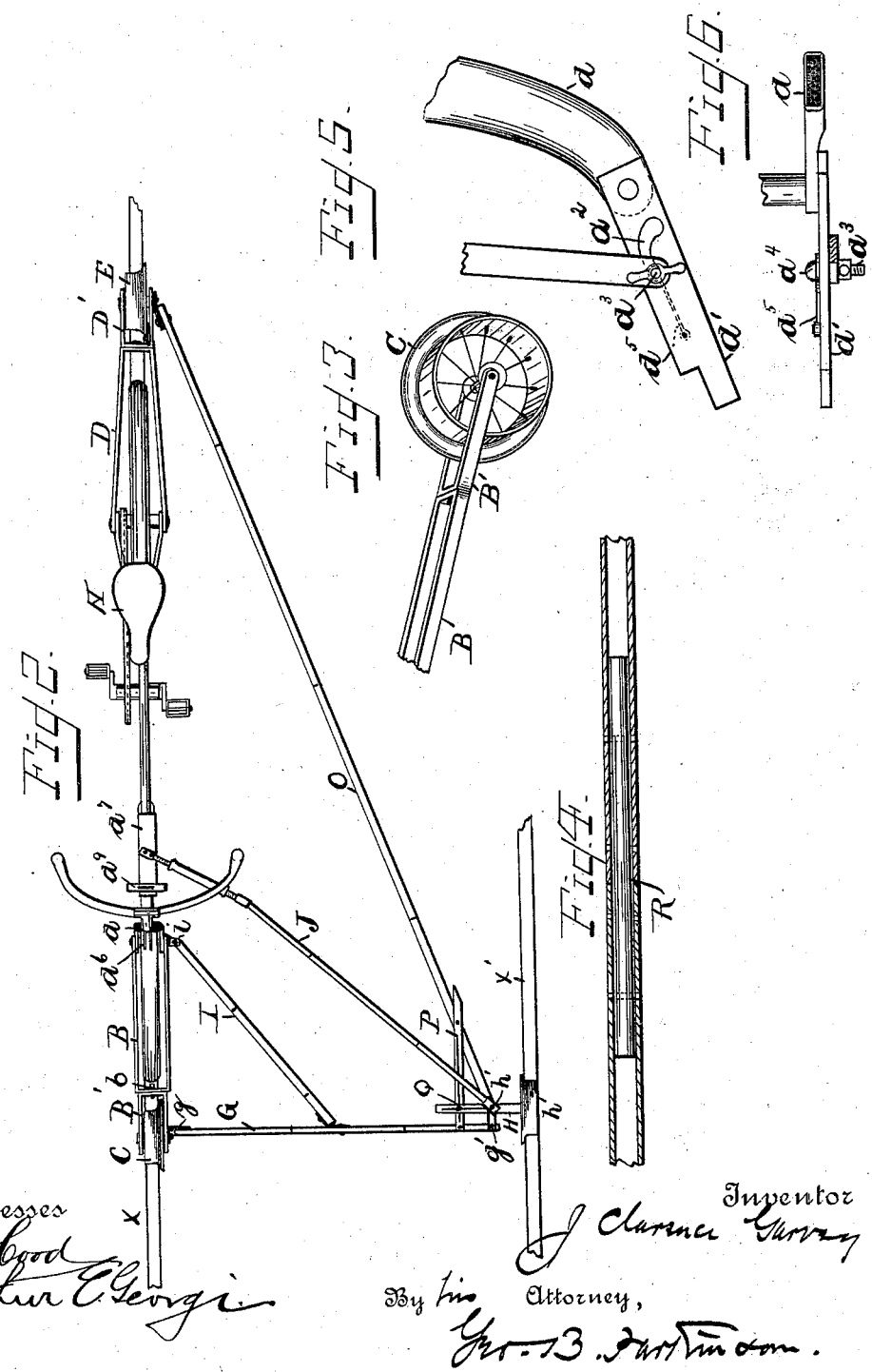

(No Model.) 4 Sheets—Sheet 3.
J. C. GARVEY.
BICYCLE ATTACHMENT.
No. 558,681. Patented Apr. 21, 1896.
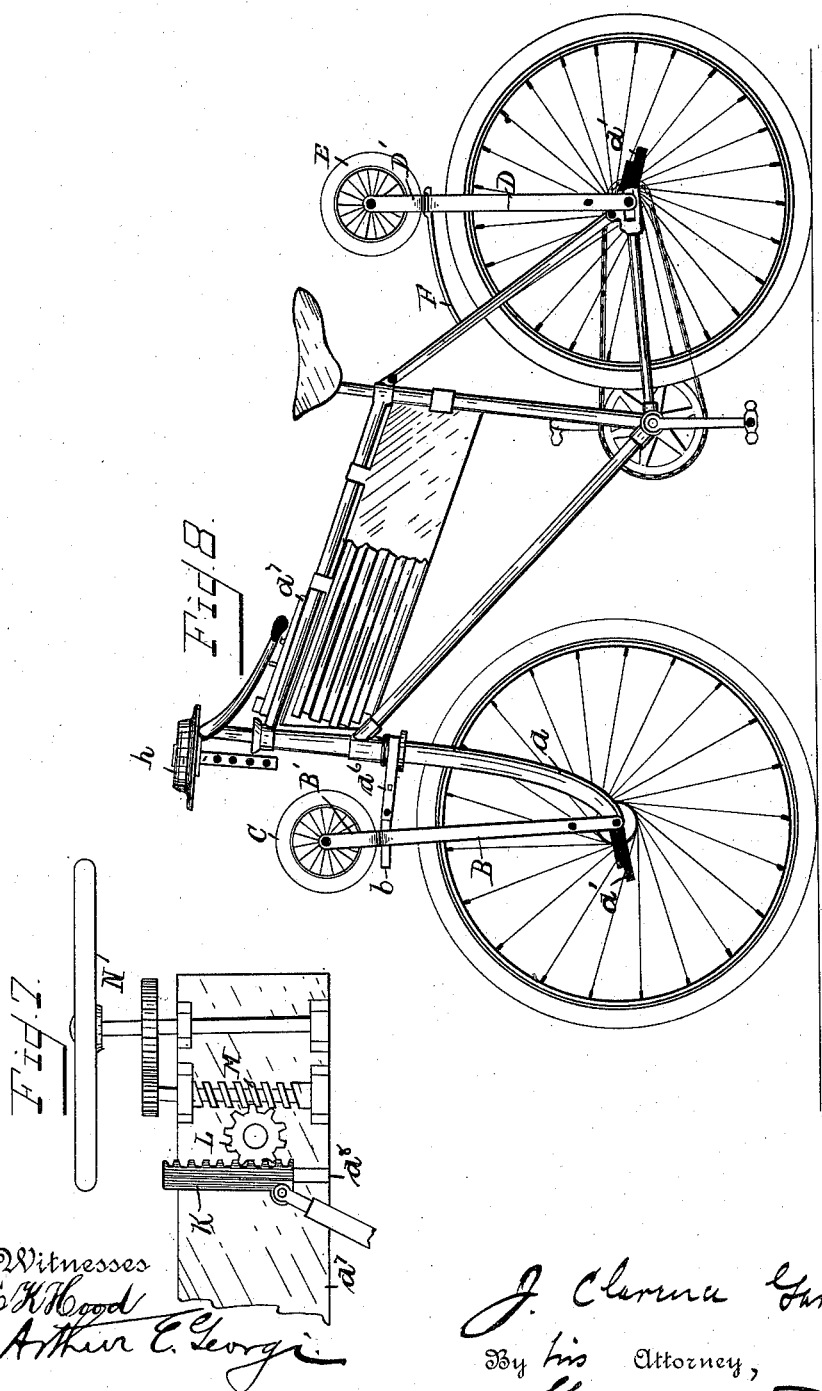

(No Model.)  4 Sheets—Sheet 4.
J. C. GARVEY.
BICYCLE ATTACHMENT.
No. 558,681.  Patented Apr. 21, 1896.
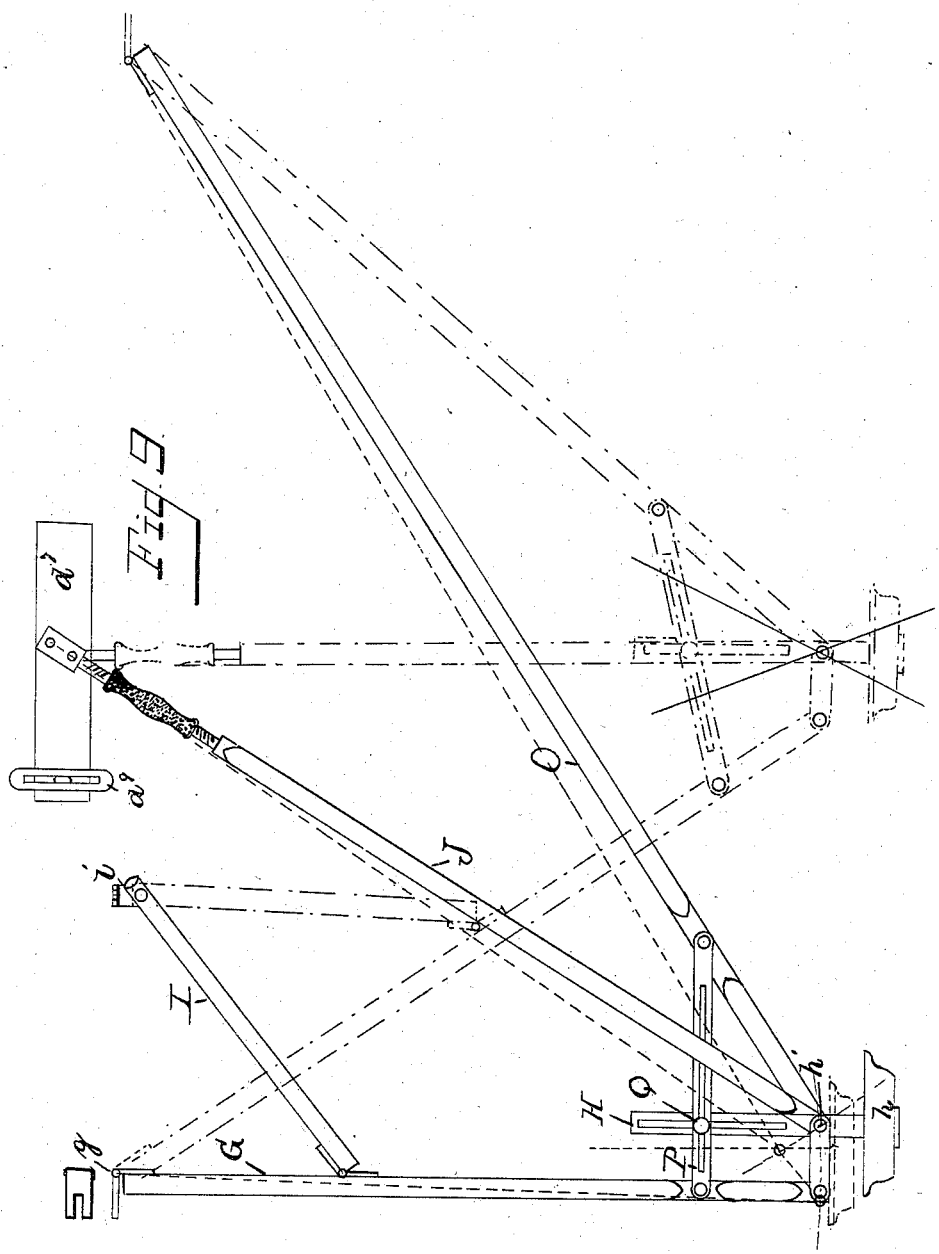

UNITED STATES PATENT OFFICE.

JOHN CLARENCE GARVEY, OF ERLANGER, KENTUCKY.

BICYCLE ATTACHMENT.

SPECIFICATION forming part of Letters Patent No. 558,681, dated April 21, 1896.

Application filed January 8, 1896. Serial No. 574,672. (No model.)

*To all whom it may concern:*

Be it known that I, JOHN CLARENCE GARVEY, a citizen of the United States, residing at Erlanger, in the county of Kenton and State of Kentucky, have invented a new and useful Improvement in Bicycle Attachments, of which the following is a specification.

The object of my invention is to provide an adjustable and collapsible attachment for safety-bicycles which will adapt them for riding on railways; and my invention consists in the combination and arrangements of parts hereinafter described and claimed.

In the drawings, Figure 1 is a perspective view of a bicycle equipped with my attachment; Fig. 2, a plan view of the same; Fig. 3, a detail of one of the flanged wheels; Fig. 4, a detail of the jointed sections; Fig. 5, a detail elevation of the end of the front fork; Fig. 6, a detail plan of the same; Fig. 7, a detail of the adjusting device for perpendicularity; Fig. 8, a side elevation of a bicycle with my device folded thereon for transportation over ordinary roads; Fig. 9, a diagrammatic view of my attachment.

Secured to the front fork $a$ of a bicycle A is a U-shaped frame B. The frame may be pivoted to the axle; but I have shown a preferred form in Figs. 5 and 6, in which a notched bar $a'$, having a curved slot $a^2$, enlarged at one end, is secured to the front fork. Passing through the end of the U-shaped frame and through this slot is a clamping-bolt $a^3$, having an enlarged end $a^4$. This head is of the same size as the enlarged end of the slot and is adapted to pass therethrough. A hook $a^5$ is pivoted to bar $a'$ and is adapted to take over clamping-bolt $a^3$. By this arrangement the U-shaped frame may be quickly removed from or placed upon the wheel.

To place the U-shaped frame upon the bicycle the headed end of clamping-bolt $a^3$ is passed through enlarged end of slot $a^2$. The bolt is then slipped forward until hook $a^5$ can take thereover. The clamping-bolt is then tightened and the U-shaped frame secured to the wheel. To remove, the reverse operation is gone through with.

The U-shaped frame is adapted to swing on its pivot into an upright position and be held in this position by means of a clip-strap $a^6$, taking around the head of the wheel and adapted to engage and grip a strip $b$, secured to the U-shaped frame B. Pivotally secured to the closed end of this U-shaped frame is a second U-shaped frame B', adapted to slide transversely relatively to frame B, and carrying a flanged wheel C, adapted to rest on one rail of a railway-track. The notched bar $a'$ prevents the U-shaped frame B from swinging into a position underneath the front wheel, should the bicycle be raised when the U-shaped frame is in its lower position.

Pivotally secured to the rear of the bicycle is a U-shaped frame D, which takes around the wheel and carries a second U-shaped frame D', pivotally secured thereto, in the same manner as frame B', and carrying a flanged wheel E. The U-shaped frame D is adapted to swing on its pivot into an upright position, as shown in Fig. 8, and be held thus by means of a spring F or into the position shown in Fig. 1, where flanged wheel E is resting on one rail of a railway-track.

Secured to frame B' by means of a hinge $g$ is a jointed bar G, carrying at its outer end a link $g'$ pivotally, secured thereto. Pivoted to the other end of link $g'$ at $h'$ is a slotted bar H, carrying at its outer end a flanged wheel $h$, which is adapted to travel upon the rail $x'$ of a railway-track. Secured to front fork $a$ or to frame B by means of a hinge and pivot $i$ is a brace-rod I, having its outer end hinged to bar G. Secured to the upper rod of bicycle A is a rectangular block $a^7$, to which is secured a brace-rod J, having its outer end pivoted to slotted bar H at $h'$ and having a length-varying mechanism therein. In Figs. 1, 2, and 9 I have shown this space-varying mechanism as consisting of an ordinary turnbuckle; but in Fig. 7 I have shown a modification in which K represents a rack-bar adapted to slide in a dovetailed groove $a^8$ in block $a^7$. A pinion L, adapted to be actuated by a worm M, actuates the rack-bar K. A hand-wheel N is mounted on a shaft parallel with worm M, and through connecting-gearing is adapted to actuate the worm. The upper end of brace-rod J is secured to rack-bar K. Block $a^7$ may be made removable from the frame of the bicycle.

Hinged to frame D' is a jointed brace-rod O, having its outer end pivoted to slotted bar H at h'.

Pivoted to brace-rods G and O is a slotted bar P, taking across slotted bar H. A binding-bolt Q is passed through the slots in bars P and H and is adapted to hold the two firmly together. This arrangement of braces enables me to set the flanged wheels in any position to accommodate them to different gages of railroads or to different angles of inclination.

In Fig. 9 I have shown in full lines the preferable position of the flanged wheel h, where it is practically opposite flanged wheel C. I have shown in dot-and-dash lines the flanged wheel thrown into a position practically opposite the saddle of the bicycle. By loosening the different bolts and nuts I am enabled to move the flanged wheel h along the straight line between its position shown in full line and that shown in dot-and-dash lines, or to move the flanged wheel inward, as shown in dotted lines. By loosening binding-bolt Q, slotted bar H may be swung on pivot h' and clamped at any required angle.

In Fig. 1 I have shown in dotted lines a possible position of the flanged wheels, in which the front bicycle-wheel leads the flanged wheel C. When the bicycle is ridden with the flanged wheels in this position, the flanged wheel E is carried by an extensible U-shaped frame and is thrown to a position a few feet in the rear of the rear wheel.

In riding I find that it is practically impossible to pass around a curve without some means of tilting the wheel to accommodate it to curves. For this purpose I interpose in the length of brace-rod J a space-varying mechanism which can be operated manually while riding, so as to tilt the bicycle to one side or the other, as may be desired. With the ordinary turnbuckle, rod J is lengthened and shortened, and by the mechanism shown in Fig. 7 the rod remains the same, but its upper end being secured to the rack-bar K, which is movable relatively to the bicycle-frame, the distance between flanged wheel h and the upper part of the bicycle-frame may be lengthened or shortened and the bicycle tilted to one side or the other. I sometimes mount a level $a^9$ upon the wheel, so as to enable me to judge the angle of inclination of the wheel.

All the brace-rods are made in sections, as shown in Fig. 4, and are secured together by central plug R. The parts are all made detachable and may be folded into the position shown in Fig. 8, where the brace-rods are all placed in a satchel supported within the frame of the bicycle. The flanged wheel h is placed on a carrier above the handle-bars. It will thus be seen that by so arranging the parts I am enabled to convert an ordinary bicycle into a railroad-bicycle, which may be accommodated to all conditions of gage and curvature.

I claim—

1. In a bicycle attachment the combination of a U-shaped frame adapted to take around the front wheel and to be pivotally secured to the fork thereof, a U-shaped frame connected with this frame and carrying a flanged wheel; a U-shaped frame adapted to take around the rear wheel and to be pivotally secured to the frame, a U-shaped frame connected therewith and carrying a flanged wheel, one or both of the connections being pivotal, a third flanged wheel and brace-rods adapted to connect the flanged wheels with each other and with the bicycle, substantially as and for the purpose set forth.

2. In a bicycle attachment the combination of a U-shaped frame adapted to take around the front wheel and to be pivotally secured to the fork thereof, a U-shaped frame connected with this frame and carrying a flanged wheel; a U-shaped frame adapted to take around the rear wheel and to be pivotally secured to the frame, a U-shaped frame connected therewith and carrying a flanged wheel, one or both of the connections being pivotal, a third flanged wheel, a jointed brace-rod, G, hinged to the forward U-shaped frame carrying at its outer end a link, g', pivotally secured thereto and having its outer end pivoted to a slotted bar, H, at, h', a jointed brace-rod, O, hinged to the rear U-shaped frame and pivotally connected with slotted bar, H, at, h', and a jointed brace-rod, J, secured to the upper bar of the bicycle-frame, pivoted to the slotted bar, H, at, h', and provided with a space-varying mechanism, substantially as and for the purpose set forth.

3. In a bicycle attachment the combination of a U-shaped frame adapted to take around the front wheel and to be pivotally secured to the fork thereof, a U-shaped frame connected with this frame and carrying a flanged wheel, a U-shaped frame adapted to take around the rear wheel and to be pivotally secured to the frame, a U-shaped frame connected therewith and carrying a flanged wheel, one or both of the connections being pivotal, a jointed brace-rod, G, hinged to the forward U-shaped frame carrying at its outer end a link, g', pivotally secured thereto and having its outer end pivoted to a slotted bar, H, at, h', a jointed brace-rod, O, hinged to the rear U-shaped frame and pivotally connected with the slotted bar, H, at, h', a jointed brace-rod, J, secured to the upper bar of the bicycle-frame, pivoted to the slotted bar, H, at, h', and having a space varying mechanism between its ends, a brace-rod, I, hinged at or near the end of the front fork of the wheel and hinged to the brace-rod, G, substantially as and for the purpose set forth.

4. In a bicycle attachment the combination of a U-shaped frame adapted to take around the front wheel and to be pivotally secured to the fork thereof, a U-shaped frame connected with this frame and carrying a flanged wheel, a U-shaped frame adapted to take around the rear wheel and to be pivotally secured to the frame, a U-shaped frame connected therewith and carrying a flanged wheel, one or both of the connections being pivotal, a jointed brace-rod, G, hinged to the forward U-shaped frame carrying at its outer end a link, $g'$, pivotally secured thereto and having its outer end pivoted to a slotted bar, H, at $h'$, a jointed brace-rod, O, hinged to the rear U-shaped frame and pivotally connected with the slotted bar, H, at $h'$, a jointed brace-rod, J, secured to the upper bar of the bicycle-frame, pivoted to the slotted bar, H, at $h'$, and having a space-varying mechanism between its ends, a brace-rod, I, hinged at or near the end of the front fork of the wheel and hinged to the brace-rod, G, a slotted bar, P, pivoted to brace-rods, G and O, and a binding-bolt passing through the slot in bars P and H, substantially as and for the purpose set forth.

5. The combination in a convertible bicycle adapted for road or railway riding of extensions on the front and rear forks of the bicycle, provided with curved slots having enlarged ends, a headed clamping-bolt passing through the extension and a U-shaped frame adapted to be secured to the bicycle, and a hook pivoted to the extension adapted to take over the clamping-bolt, substantially as and for the purpose set forth.

6. The combination in a convertible bicycle adapted for road or railway riding, of mechanism adapted to adjust the bicycle to any desired angle to the horizontal, consisting of a hand-wheel, N, mounted on a shaft, a worm, M, connecting gearing between the shaft and worm, a pinion, L, and a rack-bar, K, carrying one end of a brace-rod, substantially as and for the purpose set forth.

7. The combination in a collapsible bicycle attachment of a U-shaped frame, B, pivoted to front fork, $a$, and carrying at its outer end a second U-shaped frame, B', pivotally secured thereto and carrying a flanged wheel, C, a strip, $b$, secured to the frame, B, and a clip-strap, $a^6$, secured to the head of the bicycle and adapted to engage strip, $b$, substantially as and for the purpose set forth.

8. The combination in a collapsible bicycle attachment of a U-shaped frame, D, pivoted to the rear fork of a bicycle and carrying a second U-shaped frame pivotally connected therewith, carrying a flanged wheel, E, and a spring, F, adapted to engage the U-shaped frame, D, substantially as and for the purpose set forth.

J. CLARENCE GARVEY.

Witnesses:
E. K. HOOD,
ARTHUR E. GEORGI.